US012576485B2

(12) United States Patent
Saavedra et al.

(10) Patent No.: US 12,576,485 B2
(45) Date of Patent: Mar. 17, 2026

(54) OPEN-ENDED WRENCH WITH POLYMER ADAPTOR

(71) Applicant: Raytheon Technologies Corporation, Farmington, CT (US)

(72) Inventors: Mario J. Saavedra, Port St Lucie, FL (US); Caleb S. Gwilliams, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 384 days.

(21) Appl. No.: 18/140,833

(22) Filed: Apr. 28, 2023

(65) Prior Publication Data

US 2024/0359297 A1 Oct. 31, 2024

(51) Int. Cl.
*B25B 13/58* (2006.01)
*B25B 13/46* (2006.01)

(52) U.S. Cl.
CPC .............. *B25B 13/58* (2013.01); *B25B 13/46* (2013.01)

(58) Field of Classification Search
CPC ......... B25B 13/02; B25B 13/04; B25B 13/06; B25B 13/08; B25B 13/46; B25B 13/58
See application file for complete search history.

(56) References Cited

U.S. PATENT DOCUMENTS 2,600,617 A * 6/1952 Coates .................... B25B 13/14 81/177.85
2,651,230 A * 9/1953 Waterval ............. B25B 23/0035 81/58.3
2,766,649 A * 10/1956 Labry, Jr. .............. B25B 1/2452 269/274
3,039,339 A * 6/1962 Hanson .................. B25G 1/025 81/177.2
3,433,108 A * 3/1969 Ondeck ................... B25B 13/06 81/185
3,905,256 A * 9/1975 Foley ...................... B25B 13/14 81/177.2

(Continued)

FOREIGN PATENT DOCUMENTS

| | | | |
|---|---|---|---|
| DE | 102011056149 B4 | | 4/2015 |
| DE | 202014102948 U1 | | 9/2015 |
| JP | 3226811 U | * | 7/2020 |

OTHER PUBLICATIONS

EP Search Report for EP Patent Application No. 24172851.8 dated Aug. 27, 2024.

*Primary Examiner* — David B. Thomas
(74) *Attorney, Agent, or Firm* — Getz Balich LLC

(57) ABSTRACT

An open-ended head includes a first head jaw, a second head jaw and a head channel. The first head jaw extends widthwise between a first jaw flat and a first head edge surface. The second head jaw extends widthwise between a second jaw flat and a second head edge surface. The head channel projects lengthwise into the open-ended head. The head channel extends widthwise within the open-ended head between the first jaw flat and the second jaw flat. The open-ended head is configured from or includes a metal material. An adaptor is mated with the open-ended head. The adaptor is wrapped around the first head jaw and covers the first jaw flat and the first head edge surface. The adaptor is wrapped around the second head jaw and covers the second jaw flat and the second head edge surface. The adaptor is configured from or includes a polymer material.

17 Claims, 10 Drawing Sheets

(56) References Cited

U.S. PATENT DOCUMENTS 3,948,120 A * 4/1976 Hancock ................. B25B 13/14
81/170
4,979,355 A * 12/1990 Ulevich ................ B25B 13/107
81/DIG. 11
6,240,600 B1 6/2001 Petruska, Jr.
6,339,980 B1 1/2002 Woolf
7,237,462 B1 7/2007 Liau
7,849,767 B1 * 12/2010 Wessel, IV .............. B25G 3/04
81/177.2
8,627,561 B2 * 1/2014 Ovenshire ............. F21S 41/192
7/107
8,707,833 B1 * 4/2014 Gedeon ..................... B25B 7/10
81/414
9,302,374 B1 * 4/2016 Cusenza ................. B25B 13/58
9,925,649 B2 * 3/2018 Wyckhouse ............ B25B 23/00
10,189,149 B2 * 1/2019 Watson ................... B25B 13/12
11,034,001 B2 * 6/2021 Watson ..................... B25B 7/04
2005/0022631 A1 2/2005 Brazil
2015/0075334 A1 * 3/2015 Watson ................... B25B 13/08
81/186
2019/0321947 A1 * 10/2019 Tager ...................... B25B 13/58
2020/0070323 A1 3/2020 Thompson

* cited by examiner

OPEN-ENDED WRENCH WITH POLYMER ADAPTOR

BACKGROUND OF THE DISCLOSURE

1. Technical Field

This disclosure relates generally to a tool and, more particularly, to an open-ended wrench.

2. Background Information

Various tools are known in the art for assembling, disassembling and maintaining equipment such as a gas turbine engine. A wrench, for example, may be used to tighten or loosen a fastener or a fitting on the gas turbine engine. Various types and configurations of wrenches are known in the art such as crowfoot wrenches and open-ended wrenches. While these known wrenches have various benefits, there is still room in the art for improvement.

SUMMARY OF THE DISCLOSURE

According to an aspect of the present disclosure, a tool is provided which includes a wrench. The wrench includes an open-ended head and an adaptor. The open-ended head includes a first head jaw, a second head jaw and a head channel. The first head jaw extends widthwise between a first jaw flat and a first head edge surface. The second head jaw extends widthwise between a second jaw flat and a second head edge surface. The head channel projects lengthwise into the open-ended head. The head channel extends widthwise within the open-ended head between the first jaw flat and the second jaw flat. The open-ended head is configured from or otherwise includes a metal material. The adaptor is mated with the open-ended head. The adaptor is wrapped around the first head jaw and covers the first jaw flat and the first head edge surface. The adaptor is wrapped around the second head jaw and covers the second jaw flat and the second head edge surface. The adaptor is configured from or otherwise includes a polymer material.

According to another aspect of the present disclosure, another tool is provided which includes a crowfoot wrench. The crowfoot wrench includes an open-ended head and an adaptor. The open-ended head includes a first head jaw, a second head jaw and a head channel. The first head jaw includes a first jaw flat. The second head jaw includes a second jaw flat. The head channel projects lengthwise into the open-ended head. The head channel extends widthwise within the open-ended head between the first jaw flat and the second jaw flat. The adaptor is mated with the open-ended head. The adaptor is wrapped about the first head jaw and covers the first jaw flat. The adaptor is wrapped about the second head jaw and covers the second jaw flat.

According to still another aspect of the present disclosure, another tool is provided which includes a wrench. The wrench includes an open-ended head and an adaptor. The open-ended head includes a first head jaw, a second head jaw and a head channel. The first head jaw includes a first jaw flat. The second head jaw includes a second jaw flat. The head channel projects lengthwise into the open-ended head. The head channel extends widthwise within the open-ended head between the first jaw flat and the second jaw flat. The adaptor is mated with the open-ended head. The adaptor is wrapped about the first head jaw and covers the first jaw flat. The adaptor is wrapped about the second head jaw and covers the second jaw flat. The adaptor includes a first adaptor flat, a first guide surface, a second adaptor flat, a second guide surface and an adaptor channel. The first adaptor flat is parallel with the first jaw flat. The first guide surface extends from the first adaptor flat to a distal end of the adaptor. The first guide surface is angularly offset from the first adaptor flat. The second adaptor flat is parallel with the second jaw flat. The second guide surface extends from the second adaptor flat to the distal end of the adaptor. The second guide surface is angularly offset from the second adaptor flat. The adaptor channel projects lengthwise into the adaptor. The adaptor channel extends widthwise within the adaptor between the first adaptor flat and the second adaptor flat and between the first guide surface and the second guide surface.

The open-ended head may be constructed from a metal material. The adaptor may be constructed from a polymer material.

The polymer material may be or otherwise include a thermoplastic material.

The polymer material may include a polymer matrix and a reinforcement material within the polymer matrix.

The adaptor may include a first adaptor flat, a second adaptor flat and an adaptor channel. The first adaptor flat may be parallel with the first jaw flat. The second adaptor flat may be parallel with the second jaw flat. The adaptor channel may project lengthwise into the adaptor. The adaptor channel may extend widthwise within the adaptor between the first adaptor flat and the second adaptor flat.

The adaptor may also include a first guide surface and a second guide surface. The first guide surface may extend from the first adaptor flat to a distal end of the adaptor. The first guide surface may be angularly offset from the first adaptor flat. The second guide surface may extend from the second adaptor flat to the distal end of the adaptor. The second guide surface may be angularly offset from the second adaptor flat. The adaptor channel may also extend widthwise within the adaptor between the first guide surface and the second guide surface.

The first guide surface may be a flat surface. The second guide surface may be a flat surface.

The first adaptor flat may be parallel with the second adaptor flat.

The first adaptor flat may extend to a distal end of the adaptor. The second adaptor flat may extend to the distal end of the adaptor.

The open-ended head may extend depthwise between a first head side surface and a second head side surface. The head channel may extend depthwise through the open-ended head between the first head side surface and the second head side surface. The adaptor may cover the first head side surface and the second head side surface along the first head jaw and the second head jaw.

The adaptor may be configured as a monolithic body.

The adaptor may be configured to slide onto the open-ended head.

The adaptor may include a first depthwise segment and a second depthwise segment mated with the first depthwise segment. The first depthwise segment may cover a first depthwise side of the open-ended head. The second depthwise segment may cover a second depthwise side of the open-ended head.

The first depthwise segment may include an aperture. The second depthwise segment may include a protrusion that projects depthwise into the aperture.

The wrench may be configured as a crowfoot wrench.

The wrench may also include a mount formed integral with the open-ended head. The mount may include a mount aperture extending depthwise through the mount. The mount aperture may be configured with a polygonal cross-sectional geometry.

The tool may include a ratchet and an extension. The extension may couple the ratchet to the wrench. The extension may project into the mount aperture.

The wrench may be configured as an open-ended wrench.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
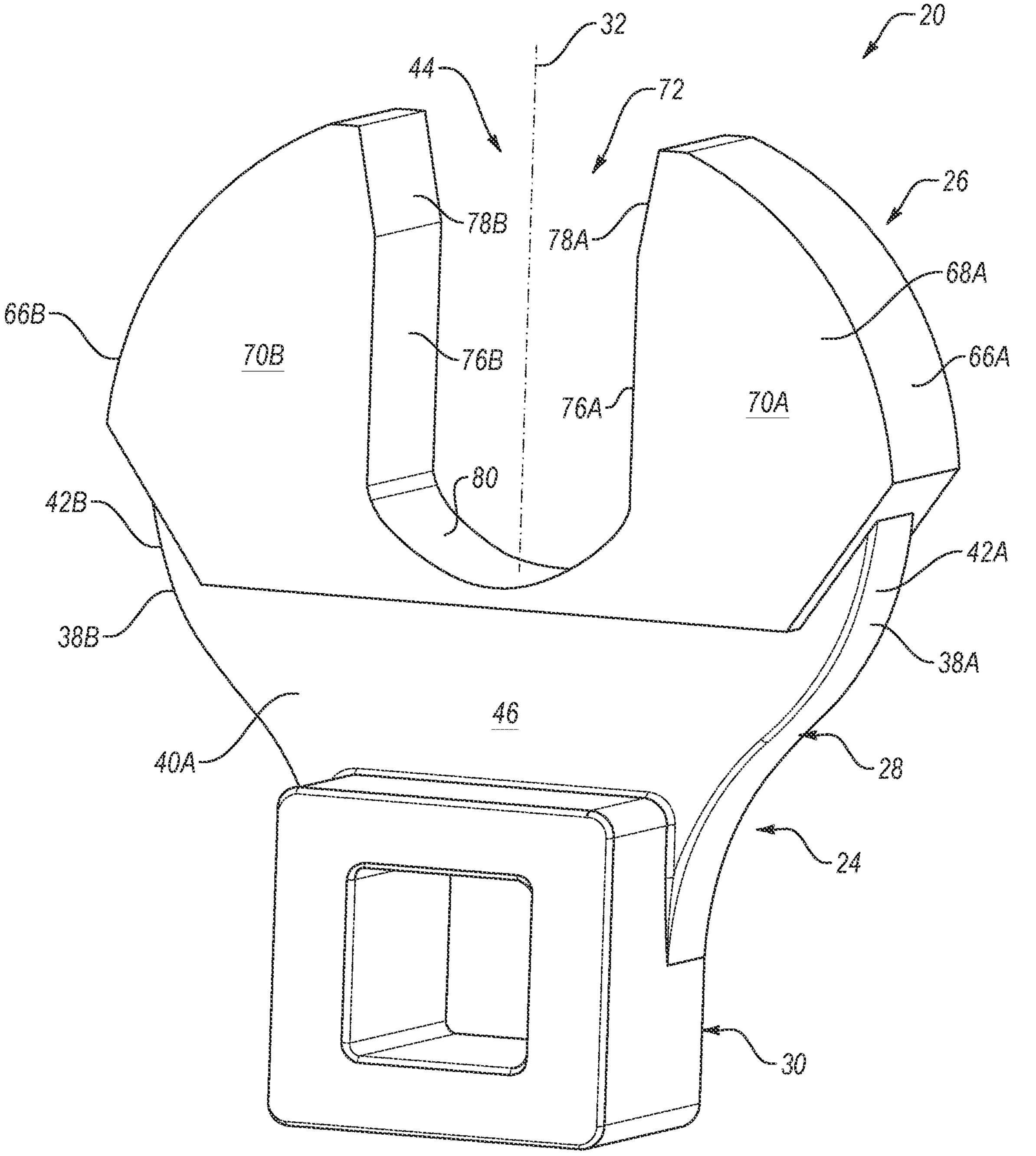
FIG. 1 is a perspective illustration of a wrench including an adaptor.
Figure 6:
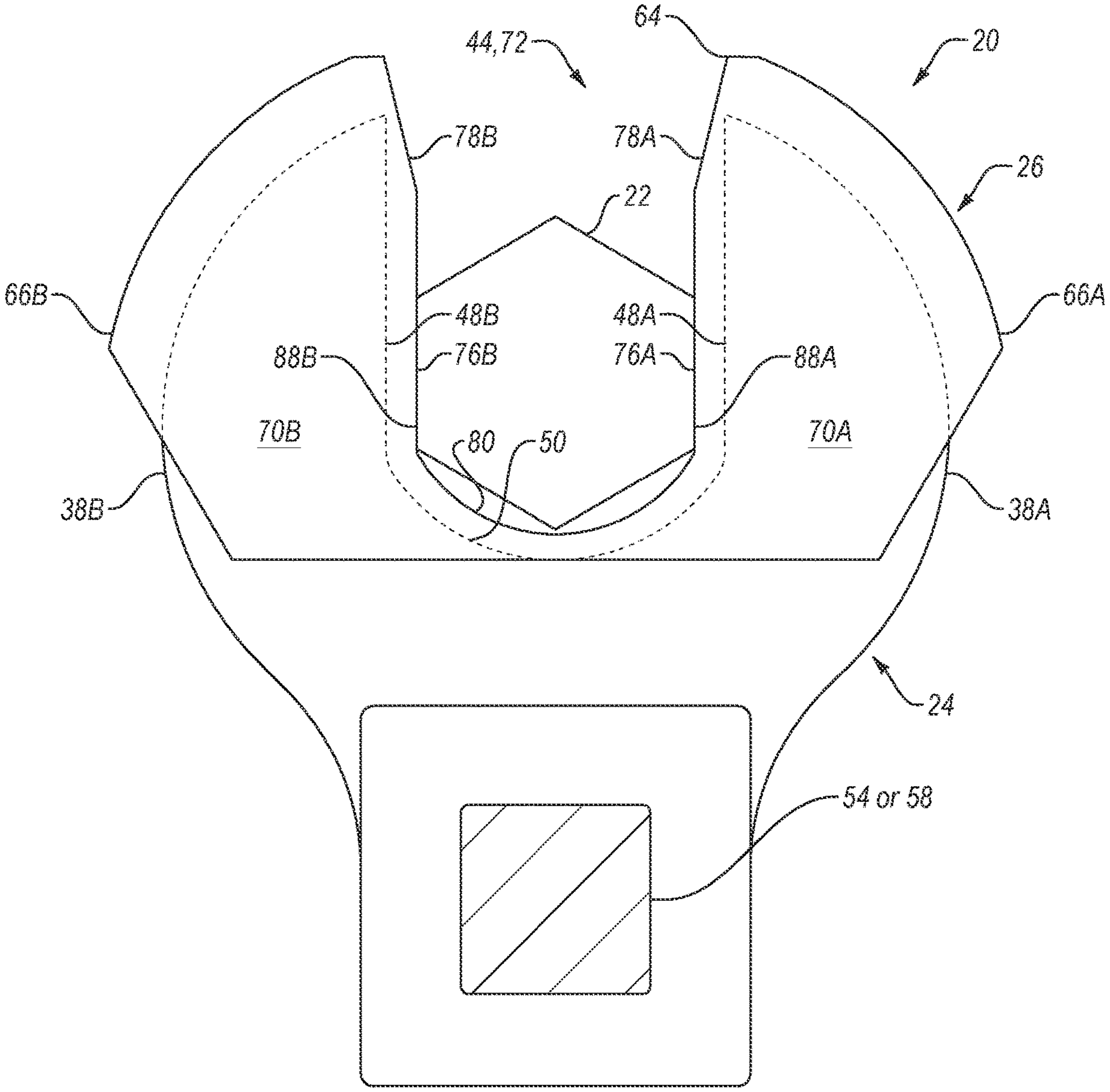
FIG. 6 is a cutaway illustration of the tool mated with a mechanical component.

FIG. 1 illustrates a wrench 20 for removing and/or installing a mechanical component (e.g., see component 22 in FIG. 6). Examples of the mechanical component include, but are not limited to, a fastener (e.g., a bolt, a nut, a stud, etc.) and a fitting (e.g., a fluid coupler, a linkage coupler, etc.). The wrench 20 may be configured as a crowfoot wrench. The wrench 20 of FIG. 1, for example, includes a (e.g., crowfoot) wrench body 24 and a wrench adaptor 26.

Figure 2:
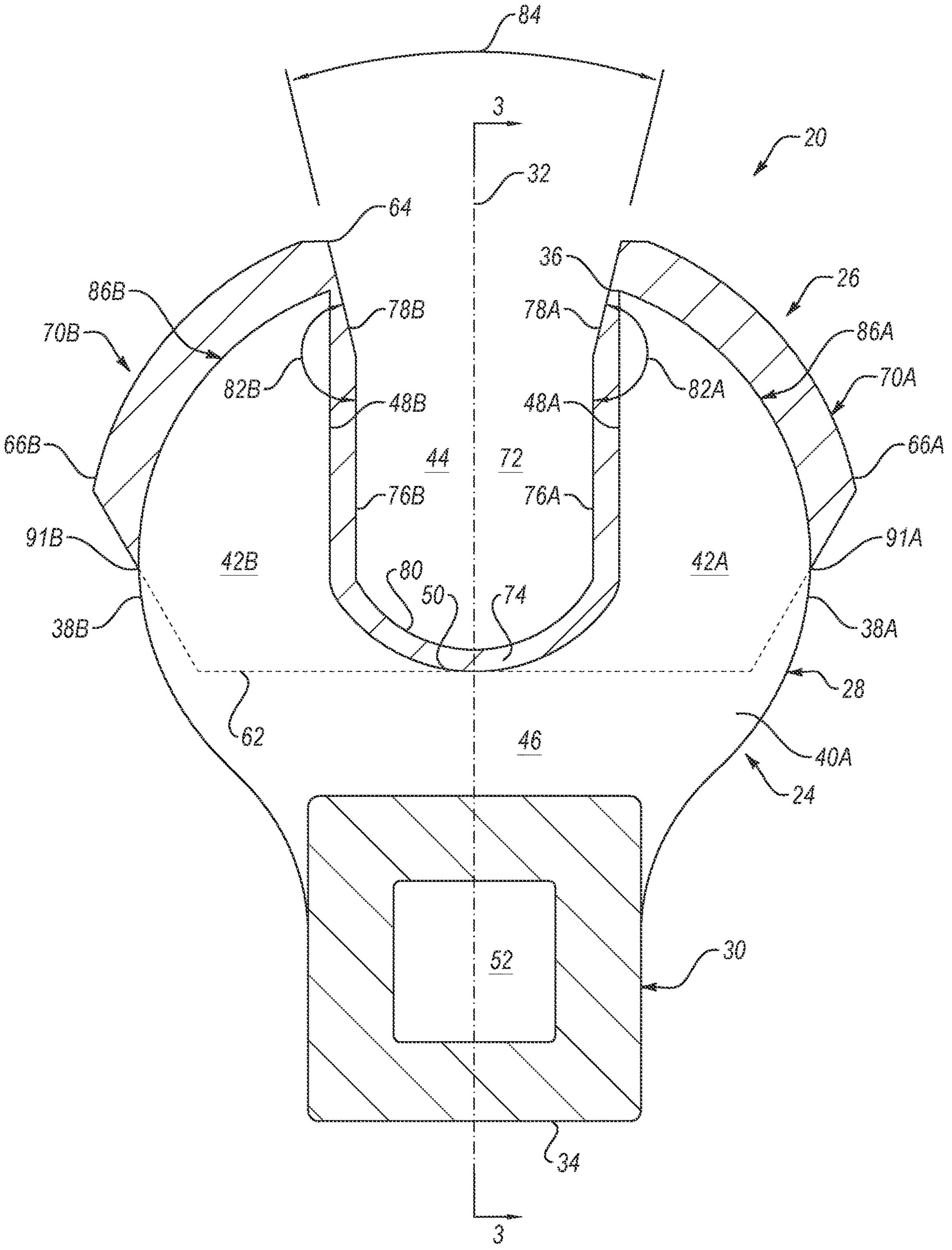
FIG. 2 is a cutaway illustration of the wrench taken along line 2-2 in FIG. 3.
Figure 3:
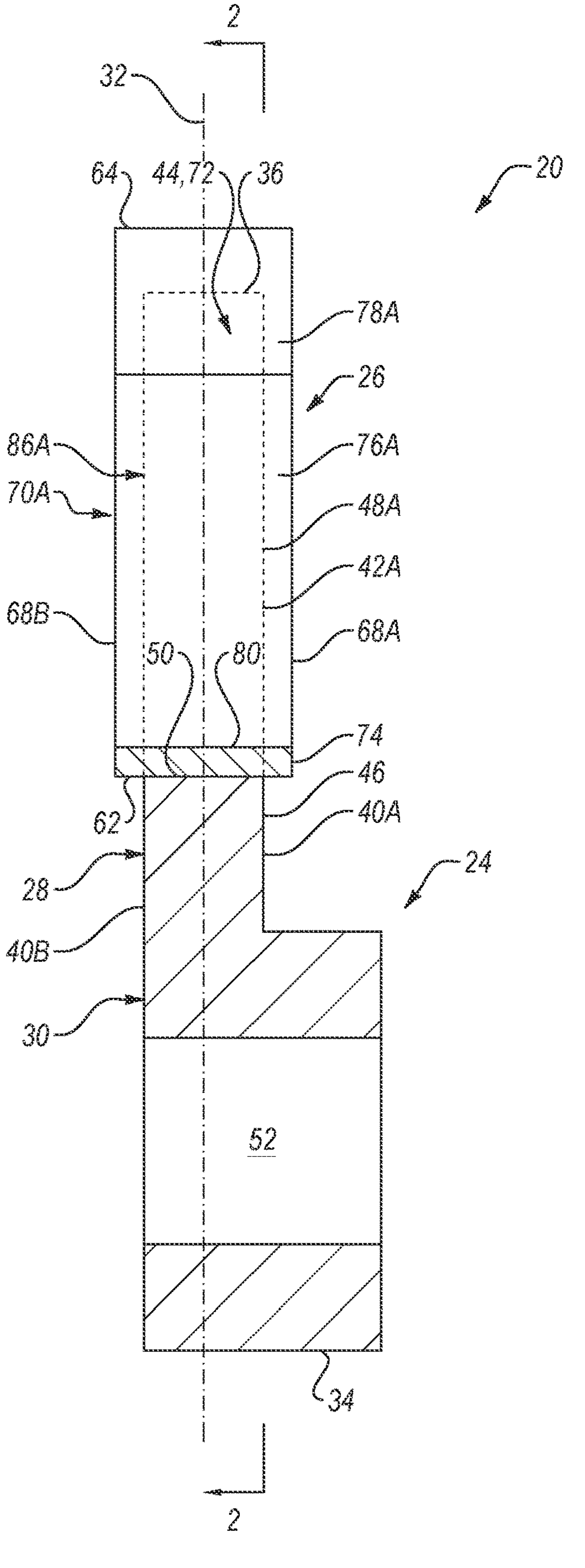
FIG. 3 is a side sectional illustration of the wrench taken along line 3-3 in FIG. 2.

Referring to FIGS. 2 and 3, the wrench body 24 includes an open-ended head 28 and a wrench base 30. This wrench body 24 extends lengthwise along a centerline 32 of the wrench 20 and/or its open-ended head 28 from a base end 34 of the wrench base 30 to a distal end 36 of the open-ended head 28.

The open-ended head 28 is connected to (e.g., formed integral with or otherwise attached to) the wrench base 30. The open-ended head 28 projects lengthwise along the centerline 32 out from the wrench base 30 to the head distal end 36. The open-ended head 28 of FIG. 2 extends laterally between and to opposing (e.g., curved, splined, etc.) exterior edge surfaces 38A and 38B (generally referred to as "38") of the open-ended head 28. The open-ended head 28 of FIG. 3 extends depthwise between and to opposing (e.g., flat) exterior side surfaces 40A and 40B (generally referred to as "40") of the open-ended head 28. The open-ended head 28 of FIGS. 2 and 3 includes a plurality of jaws 42A and 42B (generally referred to as "42") and a channel 44.

The head jaws 42 are arranged at the head distal end 36. The head jaws 42 of FIGS. 2 and 3, for example, project lengthwise along the centerline 32 out from a base 46 of the open-ended head 28 to the head distal end 36. The head jaws 42 of FIG. 2 are arranged to opposing lateral sides of the open-ended head 28. Each of the head jaws 42 of FIG. 2, for example, includes a flat 48A, 48B (generally referred to as "48"); e.g., a flat surface. Each head jaw 42 extends laterally between and to its respective head jaw flat 48 and a respective one of the head edge surfaces 38. Each head jaw flat 48 may extend lengthwise to the head distal end 36, where that head jaw flat 48 may meet a respective one of the head edge surfaces 38 at a sharp or eased (e.g., rounded) corner. The head jaw flats 48 of FIG. 2 are parallel with one another, and may also be parallel with the centerline 32. Each head jaw 42 and its respective head jaw flat 48 of FIG. 3 extends depthwise between and to the opposing head side surfaces 40.

The head channel 44 of FIG. 2 projects lengthwise along the centerline 32 into the open-ended head 28 at the head distal end 36 to a (e.g., curved, concave, etc.) channel end surface 50 of the open-ended head 28. Briefly, this head channel end surface 50 extends laterally between and to the head jaw flats 48. The head channel end surface 50 of FIG. 3 extends depthwise between and to the opposing head side surfaces 40. Referring again to FIG. 2, the head channel 44 extends laterally within the open-ended head 28 between and to the head jaw flats 48. The head channel 44 of FIG. 3 extends depthwise through the open-ended head 28 between and to the opposing head side surfaces 40.

Figure 4:
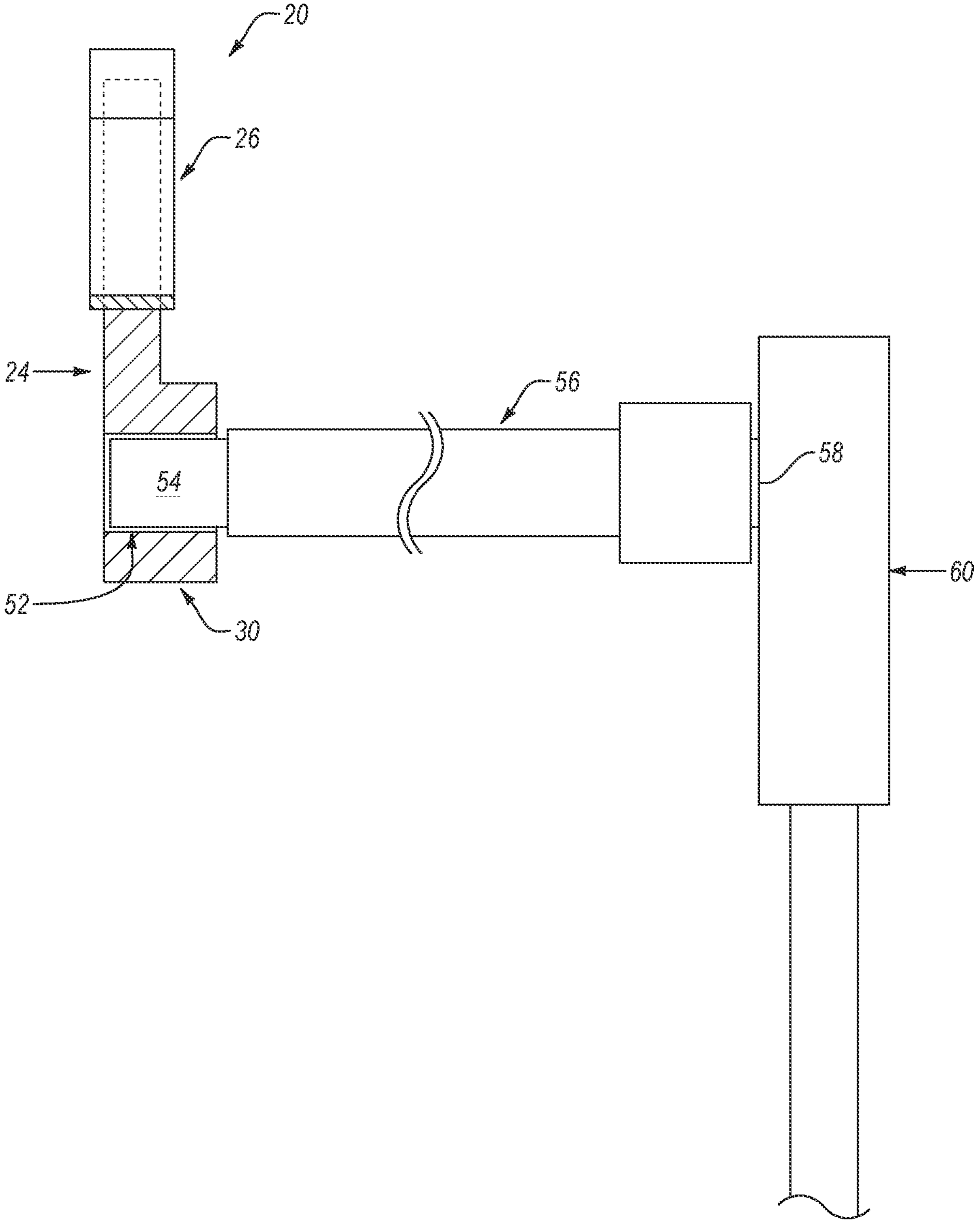
FIG. 4 is a side cutaway illustration of a tool including the wrench, a ratchet and an extension coupling the wrench to a ratchet.
Figure 5:
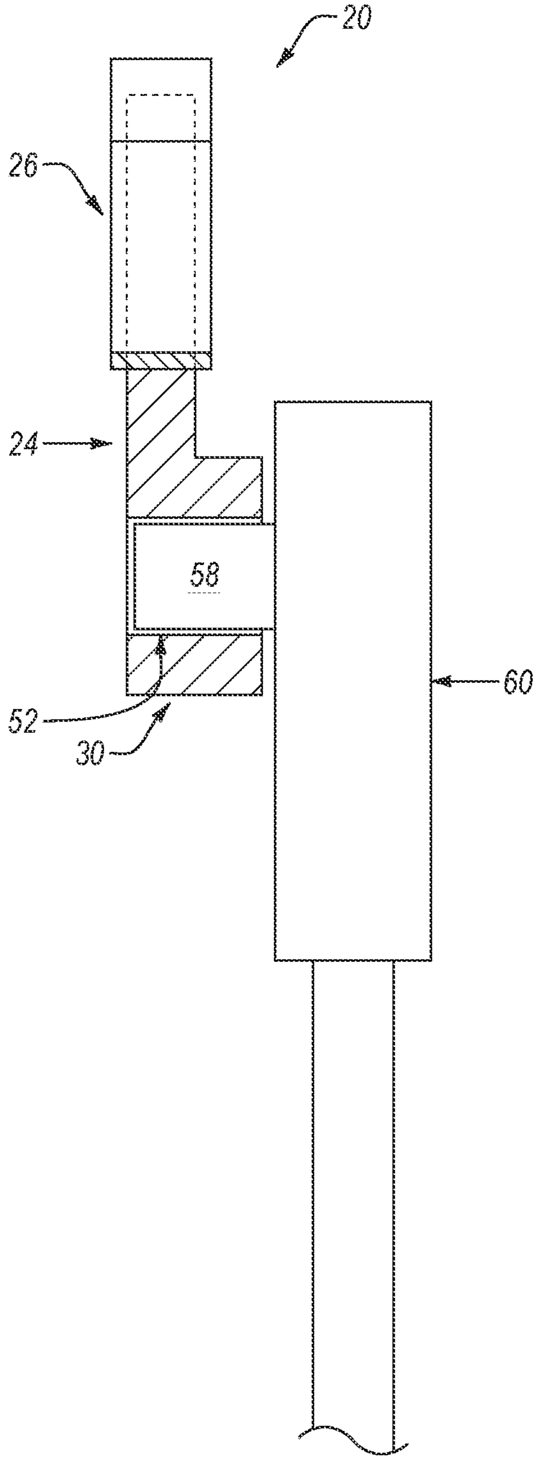
FIG. 5 is a side cutaway illustration of a tool including the wrench coupled to the ratchet.

The wrench base 30 projects lengthwise along the centerline 32 to the base end 34. This wrench base 30 may be configured as a mount for the wrench body 24. The wrench base 30 of FIGS. 2 and 3, for example, includes a mount aperture 52. The mount aperture 52 extends depthwise through the wrench base 30. The mount aperture 52 of FIG. 2 has a polygonal cross-sectional geometry. This mount aperture 52 is configured to receive a connector of a ratchet extension or a connector of a ratchet (e.g., where an extension is not utilized). The polygonal cross-sectional geometry, for example, may have a square shape. The mount aperture 52 may be sized to receive and mate with a typical ¼, ⅜ or ½ drive. An example of the mount aperture 52 receiving a connector 54 of a ratchet extension 56 is shown in FIG. 4. An example of the mount aperture 52 receiving a connector 58 of a ratchet 60 (e.g., a ratchet handle) is shown in FIG. 5.

The wrench body 24 of FIGS. 2 and 3 may be constructed from or otherwise include a metal material. Examples of the metal material include, but are not limited to, stainless steel, a chrome plated carbon steel, brass and high-carbon steel with or without plating. The present disclosure, however, is not limited to the foregoing exemplary wrench body materials.

The wrench adaptor 26 extends lengthwise along the centerline 32 from a base end 62 of the wrench adaptor 26 to a distal end 64 of the wrench adaptor 26. The wrench adaptor 26 of FIG. 2 extends laterally between and to opposing (e.g., curved, splined, etc.) exterior edge surfaces 66A and 66B (generally referred to as "66") of the wrench adaptor 26. The wrench adaptor 26 of FIG. 3 extends depthwise between and to opposing (e.g., flat) exterior side surfaces 68A and 68B (generally referred to as "68") of the wrench adaptor 26. The wrench adaptor 26 of FIGS. 2 and 3 includes a plurality of jaws 70A and 70B (generally referred to as "70") and a channel 72.

The adaptor jaws 70 are arranged at the adaptor distal end 64. The adaptor jaws 70 of FIGS. 2 and 3, for example, project lengthwise along the centerline 32 out from a base 74 of the wrench adaptor 26 to the adaptor distal end 64. The adaptor jaws 70 of FIG. 2 are arranged to opposing lateral sides of the wrench adaptor 26. Each of the adaptor jaws 70 of FIG. 2, for example, includes a flat 76A, 76B (generally referred to as "76") (e.g., a flat surface) and a (e.g., flat, or alternatively curved) guide surface 78A, 78B (generally referred to as "78"). Each adaptor jaw 70 extends laterally between and to (a) its respective adaptor flat 76 and its respective adaptor jaw guide surface 78 and (b) a respective one of the adaptor edge surfaces 66. Each adaptor flat 76 extends lengthwise from a (e.g., curved, concave, etc.) channel end surface 80 of the wrench adaptor 26 to the respective adaptor jaw guide surface 78. Each adaptor jaw guide surface 78 extends lengthwise from the respective adaptor flat 76 to the adaptor distal end 64, where the adaptor jaw guide surface 78 may meet a respective one of the adaptor edge surfaces 66 at a sharp or eased (e.g., rounded) corner. Each adaptor jaw guide surface 78 is angularly offset from the respective adaptor flat 76 by an included angle 82A, 82B (generally referred to as "82"); e.g., an obtuse angle. This angle 82 is less than one-hundred and eighty degrees (180°) and may be equal to or greater than, for example, one-hundred and sixty degrees (160°) or one-hundred and seventy degrees (170°). The adaptor flats 76 of FIG. 2 are parallel with one another, and may also be parallel with the centerline 32. The adaptor jaw guide surfaces 78 of FIG. 2 are angularly offset from one another by an included angle 84; e.g., a non-zero acute angle. This angle 84 is greater than zero degrees (0°) and may be equal to or less than, for example, twenty degrees (20°) or forty degrees (40°). Referring to FIG. 3, each adaptor jaw 70 and its elements 76 and 78 extends depthwise between and to the opposing adaptor side surfaces 68.

The adaptor channel 72 of FIG. 2 projects lengthwise along the centerline 32 into the wrench adaptor 26 at the adaptor distal end 64 to the adaptor channel end surface 80. Briefly, this adaptor channel end surface 80 extends laterally between and to the adaptor flats 76. The adaptor channel end surface 80 of FIG. 3 extends depthwise between and to the opposing adaptor side surfaces 68. Referring again to FIG. 2, the adaptor channel 72 extends laterally within the wrench adaptor 26 between and to (a) the adaptor flats 76 and (b) between and to the adaptor guide surfaces 78. The adaptor channel 72 of FIG. 3 extends depthwise through the wrench adaptor 26 between and to the opposing adaptor side surfaces 68.

The wrench adaptor 26 is mated with and connected to (e.g., friction fit onto, or otherwise attached to) the wrench body 24 and its open-ended head 28. In particular, the wrench adaptor 26 is configured as a sleeve, a covering, a coating and/or the like for the wrench body 24. The wrench body 24 of FIGS. 2 and 3, for example, projects into a receptacle within the wrench adaptor 26. Each head jaw 42 of FIGS. 2 and 3, for example, projects into a blind aperture 86A, 86B (generally referred to as "86") in the respective adaptor jaw 70. The wrench adaptor 26 and each of its adaptor jaws 70 thereby at least partially (or completely) covers each respective head jaw 42. Each adaptor jaw 70 of FIGS. 2 and 3, for example, wraps circumferentially about (e.g., completely around) the respective head jaw 42. Each adaptor jaw 70 may thereby cover each surface 38, 40, 48 and 50 of/along the respective head jaw 42. Here, each adaptor flat 76 is parallel with and extends at least partially along the respective head jaw flat 48. The wrench adaptor 26 may thereby cover each surface of the open-ended head 28 which may contact the mechanical component to be removed and/or installed. The wrench adaptor 26 may also cover various surfaces of the open-ended head 28 which may incidentally contact other components around the mechanical component to be removed and/or installed.

The wrench adaptor 26 is configured to provide the wrench body 24 with a softer surface to reduce process induced damage (PID) when removing and/or installing the mechanical component with the wrench 20. The wrench adaptor 26 of FIGS. 2 and 3, for example, may be constructed from or otherwise include a polymer material. This polymer material may be a thermoplastic material such as, but not limited to, nylon. Alternatively, the polymer material may include a reinforcement (e.g., stiffening) material within a polymer matrix. A non-limiting example of the reinforcement material is glass reinforcement; e.g., glass fibers and/or glass powder. The polymer matrix may be the thermoplastic material. The present disclosure, however, is not limited to the foregoing exemplary wrench adaptor materials.

During operation, referring to FIG. 6, the wrench 20 is mated with the mechanical component 22. The mechanical component 22, for example, is inserted into the adaptor channel 72. Each adaptor flat 76 is disposed adjacent and contacts (e.g., is abutted laterally against) a respective flat 88A, 88B (generally referred to as "88") of the mechanical component 22. With this arrangement, the wrench adaptor 26 provides a stiff buffer between the wrench body 24 and its open-ended head 28. The soft nature of the adaptor material relative to material of the mechanical component 22 may reduce or prevent process induced damage (e.g., scratches, indentations, deformation and/or other blemishes) to the mechanical component 22. Moreover, the soft nature of the adaptor material may also reduce or prevent process induced damage to other components near and about the mechanical component 22. However, the adaptor material is selected to be stiff enough to facilitate proper torquing of the mechanical component 22 during installation.

Figure 7:
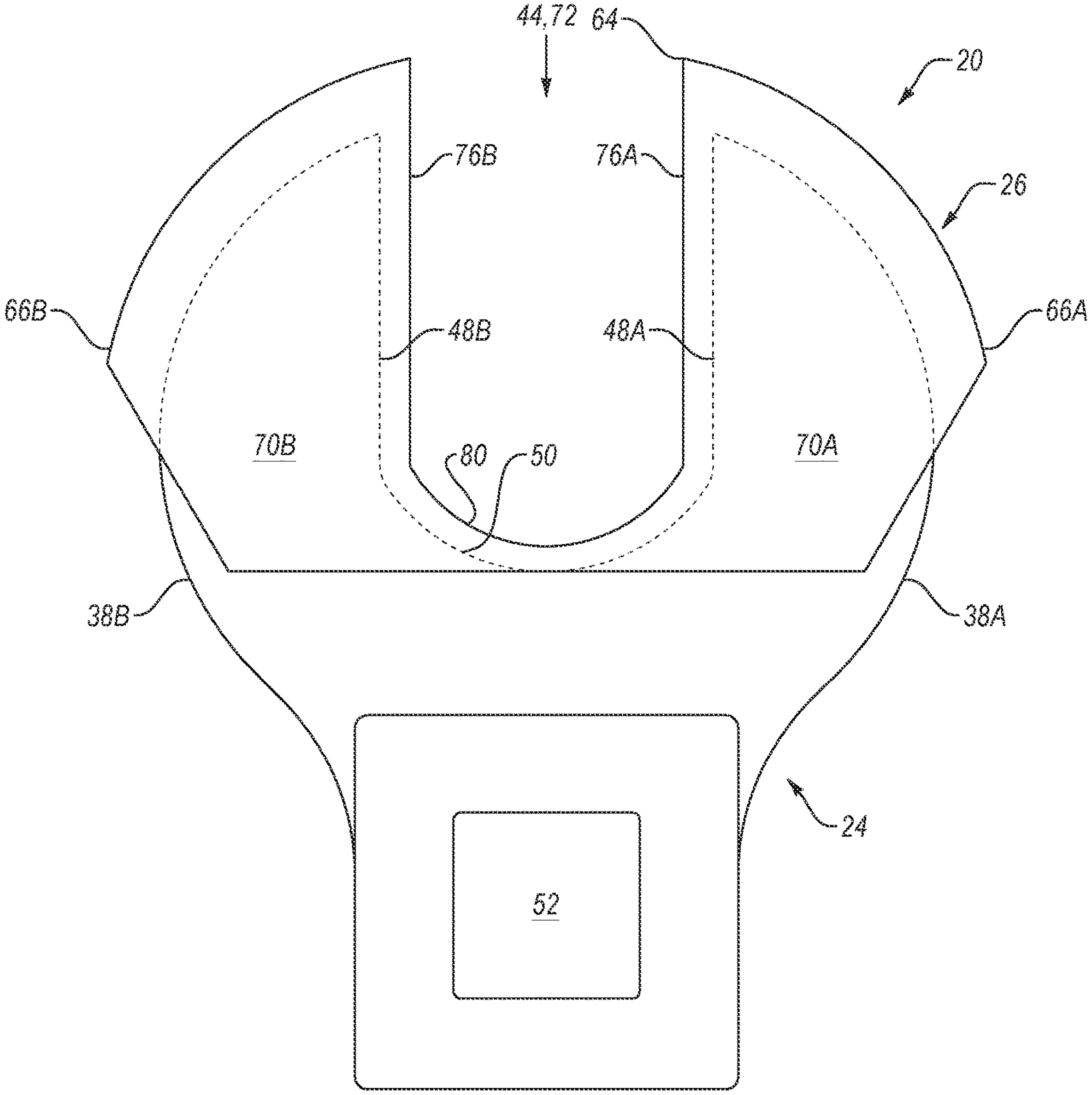
FIG. 7 is an illustration of the wrench with another adaptor configuration.

In some embodiments, referring to FIG. 6, a portion of the adaptor channel 72 at the adaptor distal end 64 may be configured with a flared geometry to facilitate guiding of the mechanical component 22 into the adaptor channel 72. In other embodiments however, referring to FIG. 7, the adaptor channel 72 may be configured without such a flared geometry at the adaptor distal end 64. The wrench adaptor 26 of FIG. 7, for example, is configured without the adaptor guide surfaces 78 of FIG. 6. With such an arrangement, each adaptor flat 76 of FIG. 7 extends lengthwise from the adaptor channel end surface 80 to the adaptor distal end 64, where the adaptor flat 76 may meet a respective one of the adaptor edge surfaces 66 at a sharp or eased (e.g., rounded) corner.

Figure 9:
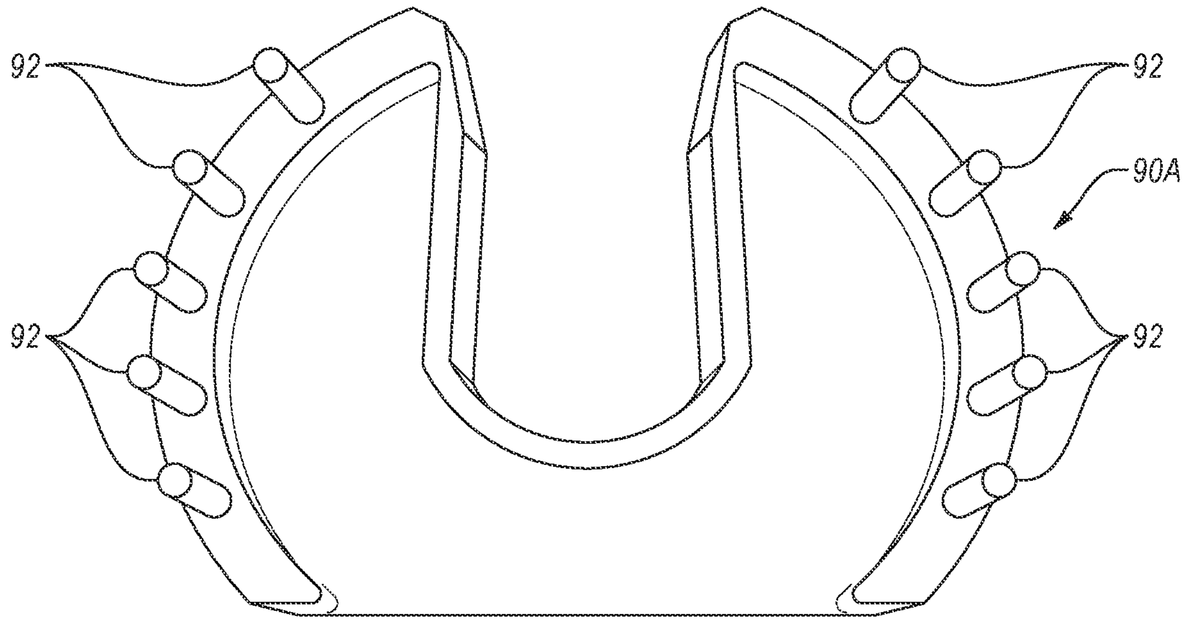
FIG. 9 is a perspective illustration of a first segment of the adaptor of FIG. 8.
Figure 10:
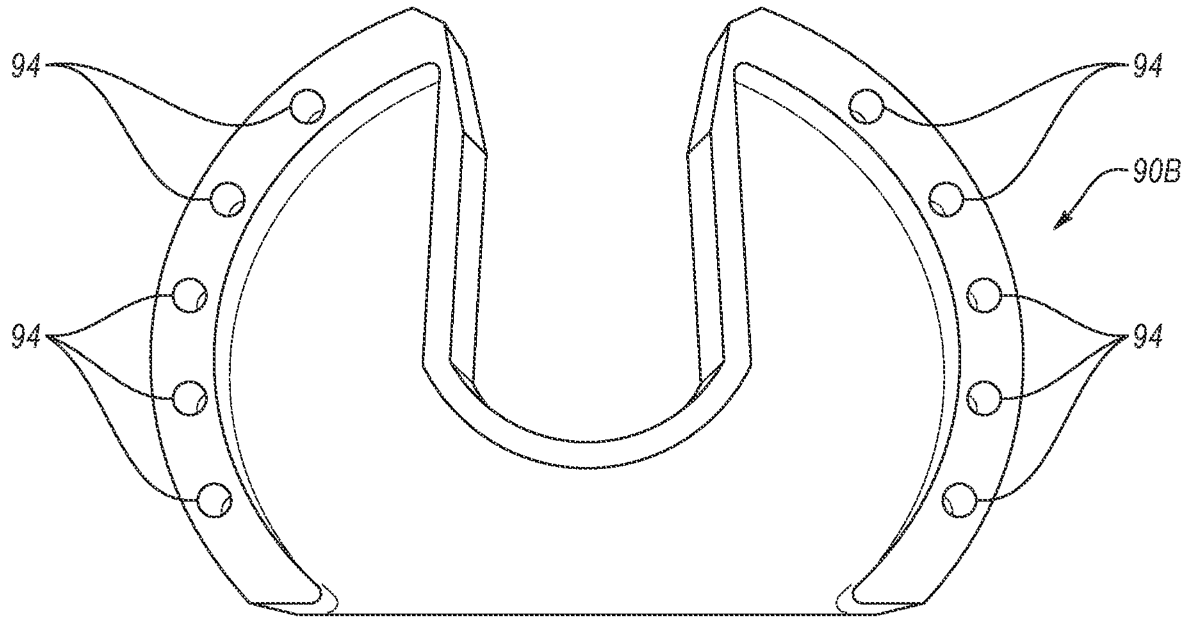
FIG. 10 is a perspective illustration of a second segment of the adaptor of FIG. 8.

The wrench adaptor 26 may be formed using one or more manufacturing techniques. Examples of these manufacturing techniques include, but are not limited to, additive manufacturing (e.g., selective laser sintering), casting and/or machining. In some embodiments, referring to FIGS. 1-3, the wrench adaptor 26 may be configured as a single monolithic body. In other embodiments, referring to FIGS. 8-10, the wrench adaptor 26 may be configured from multiple (e.g., discretely formed) adaptor segments 90A and 90B (generally referred to as "90") attached to one another. The wrench adaptor 26 of FIG. 8, for example, is formed by mating the adaptor segments 90 together about the wrench body 24 and its open-ended head 28. With such an arrangement, the wrench adaptor 26 may cover substantially an entirety of the open-ended head 28; e.g., beyond apexes 91A, 91B (see FIG. 2) of the head edge surfaces 38.

Figure 8:
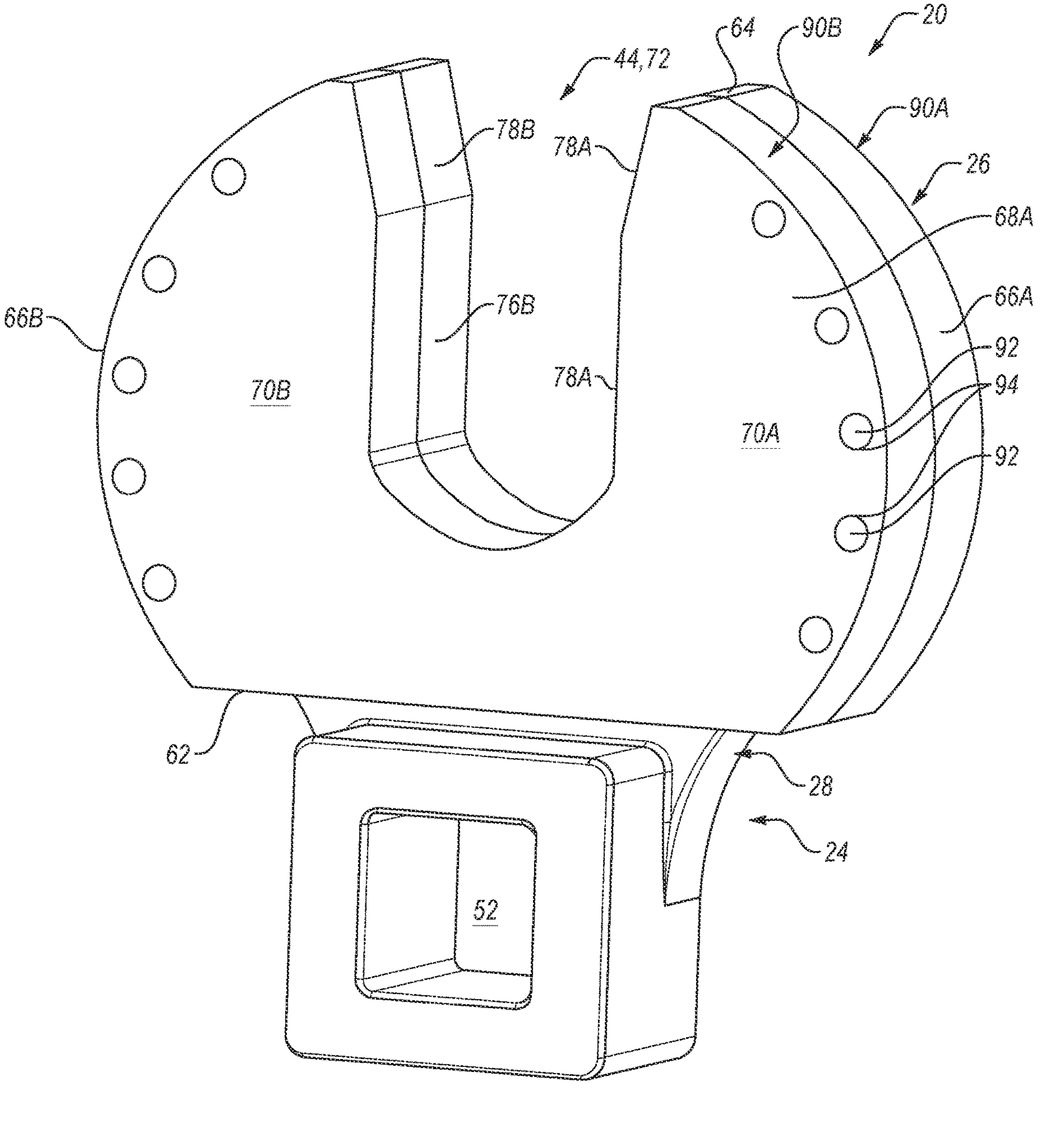
FIG. 8 is a perspective illustration of the wrench with still another adaptor configuration.

The adaptor segments 90 may be configured as halves of the wrench adaptor 26. These adaptor segments 90 may be attached to one another through an interlocking interface. The first adaptor segment 90A of FIG. 9, for example, includes one or more protrusions 92. The second adaptor segment 90B of FIG. 10 includes one or more apertures 94; e.g., through-holes. Referring to FIG. 8, when the adaptor segments 90 are mated together, each of the protrusions 92 may project (e.g., laterally) into a respective one of the apertures 94. The adaptor segments 90 may also or alternatively be bonded or otherwise attached to one another.

Figure 11:
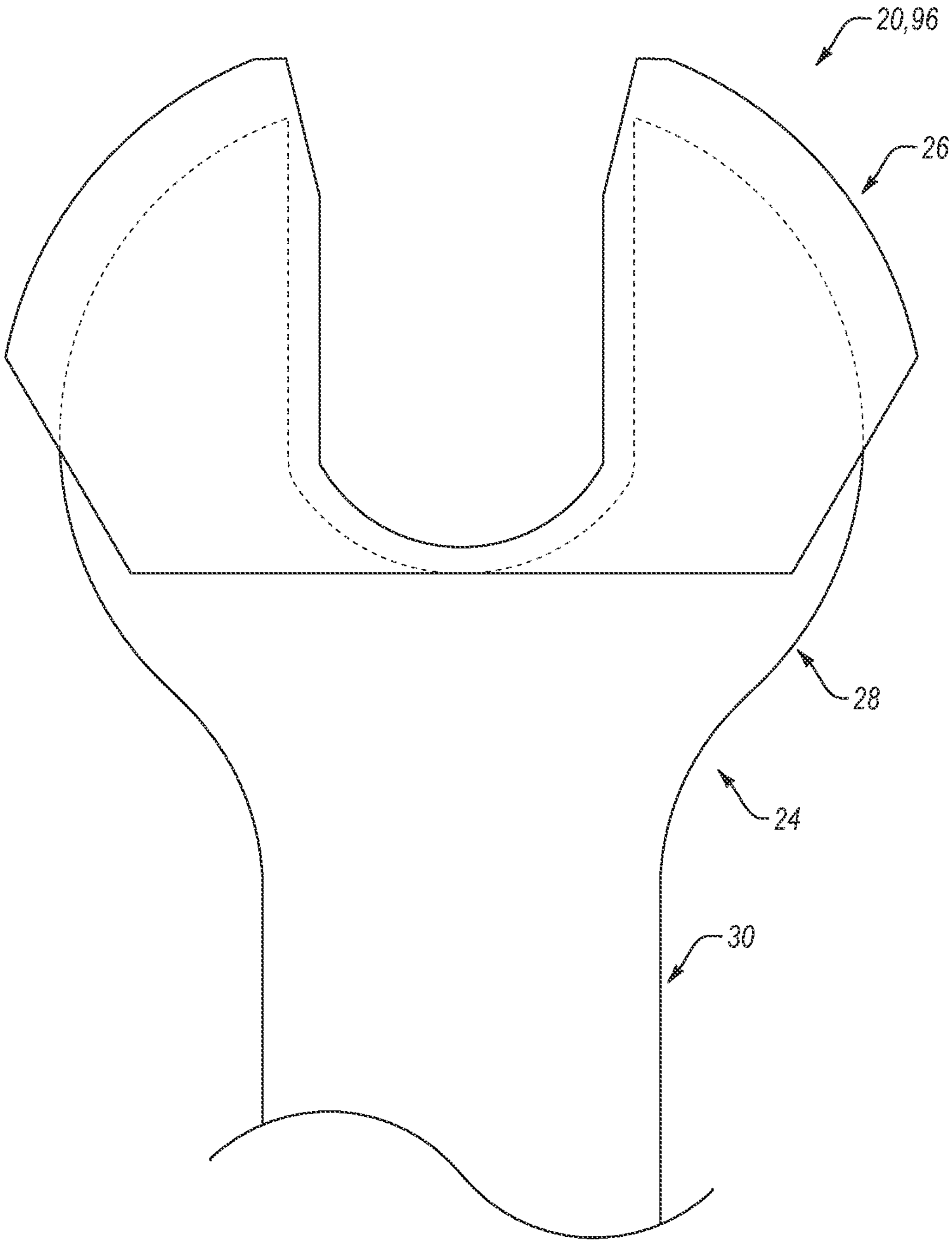
FIG. 11 is a partial illustration of another wrench configured with the adaptor.

The wrench 20 is described above as a crowfoot wrench for a tool which includes the ratchet 60 and optionally the ratchet extension 56. However, referring to FIG. 11, the wrench 20 and, more generally, the tool may alternatively be configured as an open-ended wrench 96. The wrench base 30 of FIG. 11, for example, is configured as a handle rather than the mount of FIGS. 2 and 3.

The wrench 20 of the present disclosure may be utilized in assembly, disassembly and/or maintenance of various pieces of equipment. An example of the equipment is a gas turbine engine. The present disclosure, however, is not limited to gas turbine engine applications. The wrench 20, for example, may be utilized in assembly, disassembly and/or maintenance of other aircraft structures, or equipment and structure in other applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A tool, comprising:

a wrench including an open-ended head and an adaptor;

the open-ended head including a first head jaw, a second head jaw and a head channel, the first head jaw extending widthwise between a first jaw flat and a first head edge surface, the second head jaw extending widthwise between a second jaw flat and a second head edge surface, the head channel projecting lengthwise into the open-ended head, the head channel extending widthwise within the open-ended head between the first jaw flat and the second jaw flat, and the open-ended head comprising a metal material;

the adaptor mated with the open-ended head, the adaptor wrapped around the first head jaw and covering the first jaw flat and the first head edge surface, the adaptor wrapped around the second head jaw and covering the second jaw flat and the second head edge surface, and the adaptor comprising a polymer material;

the adaptor including a first adaptor flat, a second adaptor flat and an adaptor channel, the first adaptor flat parallel with the first jaw flat, the second adaptor flat parallel with the second jaw flat, the adaptor channel projecting lengthwise into the adaptor, and the adaptor channel extending widthwise within the adaptor between the first adaptor flat and the second adaptor flat; and the adaptor further including a first guide surface and a second guide surface, the first guide surface extending from the first adaptor flat to a distal end of the adaptor, the first guide surface angularly offset from the first adaptor flat, the second guide surface extending from the second adaptor flat to the distal end of the adaptor, the second guide surface angularly offset from the second adaptor flat, and the adaptor channel further extending widthwise within the adaptor between the first guide surface and the second guide surface.

2. The tool of claim 1, wherein the polymer material comprises a thermoplastic material.

3. The tool of claim 1, wherein the polymer material comprises a polymer matrix and a reinforcement material within the polymer matrix.

4. The tool of claim 1, wherein the first guide surface is a flat surface; and the second guide surface is a flat surface.

5. The tool of claim 1, wherein the first adaptor flat is parallel with the second adaptor flat.

6. The tool of claim 1, wherein the open-ended head extends depthwise between a first head side surface and a second head side surface;

the head channel extends depthwise through the open-ended head between the first head side surface and the second head side surface; and the adaptor covers the first head side surface and the second head side surface along the first head jaw and the second head jaw.

7. The tool of claim 1, wherein the adaptor is configured as a monolithic body.

8. The tool of claim 1, wherein the adaptor is configured to slide onto the open-ended head.

9. The tool of claim 1, wherein the adaptor includes a first depthwise segment and a second depthwise segment mated with the first depthwise segment;

the first depthwise segment covers a first depthwise side of the open-ended head; and the second depthwise segment covers a second depthwise side of the open-ended head.

10. The tool of claim 9, wherein the first depthwise segment comprises an aperture; and the second depthwise segment comprises a protrusion that projects depthwise into the aperture.

11. The tool of claim 1, wherein the wrench is configured as a crowfoot wrench.

12. The tool of claim 1, wherein the wrench further includes a mount formed integral with the open-ended head; and the mount comprises a mount aperture extending depthwise through the mount, and the mount aperture is configured with a polygonal cross-sectional geometry.

13. The tool of claim 12, further comprising:

a ratchet; and an extension coupling the ratchet to the wrench, the extension projecting into the mount aperture.

14. The tool of claim 1, wherein the wrench is configured as an open-ended wrench.

15. A tool, comprising:

a crowfoot wrench including an open-ended head and an adaptor;

the open-ended head including a first head jaw, a second head jaw and a head channel, the first head jaw comprising a first jaw flat, the second head jaw comprising a second jaw flat, the head channel projecting lengthwise into the open-ended head, and the head channel extending widthwise within the open-ended head between the first jaw flat and the second jaw flat;

the adaptor mated with the open-ended head, the adaptor wrapped about the first head jaw and covering the first jaw flat, and the adaptor wrapped about the second head jaw and covering the second jaw flat; and the crowfoot wrench further including a mount formed integral with the open-ended head, the mount comprising a mount aperture extending depthwise through the mount, the mount aperture depthwise overlapping the head channel, and the mount aperture configured with a polygonal cross-sectional geometry.

16. A tool, comprising:

a wrench including an open-ended head and an adaptor;

the open-ended head including a first head jaw, a second head jaw and a head channel, the first head jaw comprising a first jaw flat, the second head jaw comprising a second jaw flat, the head channel projecting lengthwise into the open-ended head, and the head channel extending widthwise within the open-ended head between the first jaw flat and the second jaw flat;

the adaptor mated with the open-ended head, the adaptor wrapped about the first head jaw and covering the first jaw flat, and the adaptor wrapped about the second head jaw and covering the second jaw flat; and the adaptor including a first adaptor flat, a first guide surface, a second adaptor flat, a second guide surface and an adaptor channel, the first adaptor flat parallel with the first jaw flat, the first guide surface extending from the first adaptor flat to a distal end of the adaptor, the first guide surface angularly offset from the first adaptor flat, the second adaptor flat parallel with the second jaw flat, the second guide surface extending from the second adaptor flat to the distal end of the adaptor, the second guide surface angularly offset from the second adaptor flat, the adaptor channel projecting lengthwise into the adaptor, and the adaptor channel extending widthwise within the adaptor between the first adaptor flat and the second adaptor flat and between the first guide surface and the second guide surface.

17. The tool of claim 16, wherein the open-ended head is constructed from a metal material; and the adaptor is constructed from a polymer material.

* * * * *